US012490035B2

(12) United States Patent
Talebanpour et al.

(10) Patent No.: US 12,490,035 B2
(45) Date of Patent: Dec. 2, 2025

(54) COMBINED CHARGING CONTACT AND ANTENNA FOR HEARING INSTRUMENTS

(71) Applicant: Starkey Laboratories, Inc., Eden Prairie, MN (US)

(72) Inventors: Babak Talebanpour, Plymouth, MN (US); Ganesh Borra, Plymouth, MN (US); Ryan Owens, Hopkins, MN (US); Gregory John Haubrich, Champlin, MN (US); Zhenchao Yang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 193 days.

(21) Appl. No.: 18/305,853

(22) Filed: Apr. 24, 2023

(65) Prior Publication Data

US 2023/0345188 A1 Oct. 26, 2023

Related U.S. Application Data

(60) Provisional application No. 63/363,549, filed on Apr. 25, 2022.

(51) Int. Cl.

| | |
|---|---|
| ***H04R 25/00*** | (2006.01) |
| ***H01Q 7/00*** | (2006.01) |
| ***H02J 50/10*** | (2016.01) |
| ***H04R 1/10*** | (2006.01) |

(52) U.S. Cl.

CPC ............ *H04R 25/656* (2013.01); *H01Q 7/00* (2013.01); *H02J 50/10* (2016.02); *H04R 1/1016* (2013.01); *H04R 25/554* (2013.01); *H04R 2225/023* (2013.01); *H04R 2225/31* (2013.01); *H04R 2225/51* (2013.01)

(58) Field of Classification Search

CPC ........... H04R 2225/51; H04R 2225/31; H04R 2225/023; H04R 25/554; H04R 1/1016; H04R 25/656; H02J 50/10; H01Q 7/00

See application file for complete search history.

(56) References Cited

U.S. PATENT DOCUMENTS

| | | | |
|---|---|---|---|
| 4,887,693 | A | 12/1989 | Plice |
| 4,987,597 | A | 1/1991 | Haertl |
| D941,475 | S | 1/2022 | Burns et al. |

(Continued)

FOREIGN PATENT DOCUMENTS

| | | |
|---|---|---|
| WO | 2021015998 A1 | 1/2021 |
| WO | 2021262318 A1 | 12/2021 |

OTHER PUBLICATIONS

Office Action from U.S. Appl. No. 18/305,822 dated Jan. 29, 2025, 7 pp.

(Continued)

*Primary Examiner* — Sunita Joshi

(74) *Attorney, Agent, or Firm* — Shumaker & Sieffert, P.A.

(57) ABSTRACT

A hearing instrument comprises a housing having an exterior surface and an interior surface; a rechargeable battery; a first conductor having an external segment tracing a first path on the exterior surface of the housing; and a second conductor having an external segment tracing a second path on the exterior surface of the housing. The first conductor and the second conductor are configured to operate as both an antenna and to conduct electricity from a charger to recharge the rechargeable battery.

13 Claims, 10 Drawing Sheets

(56) References Cited

U.S. PATENT DOCUMENTS

| | | | | |
|---|---|---|---|---|
| 2003/0044037 | A1 | 3/2003 | Park | |
| 2003/0123687 | A1 | 7/2003 | Petrick et al. | |
| 2007/0245039 | A1* | 10/2007 | Dahneke | G06F 9/4411 710/15 |
| 2009/0115666 | A1 | 5/2009 | Wulff et al. | |
| 2011/0044464 | A1 | 2/2011 | Sapiejewski et al. | |
| 2017/0245039 | A1 | 8/2017 | Chen | |
| 2019/0141460 | A1 | 5/2019 | Hasani | |
| 2021/0051427 | A1* | 2/2021 | Schmidt | H04R 25/554 |
| 2022/0030364 | A1* | 1/2022 | Hasani | H01Q 1/273 |
| 2022/0109924 | A1 | 4/2022 | Carlson et al. | |
| 2022/0279293 | A1* | 9/2022 | Hasani | H04R 25/65 |
| 2023/0199365 | A1 | 6/2023 | Olson et al. | |

OTHER PUBLICATIONS

U.S. Appl. No. 18/305,822, filed Apr. 24, 2023, naming inventors Borra et al.

Notice of Allowance from U.S. Appl. No. 18/305,822 dated Jun. 6, 2025, 9 pp.

Response to Office Action dated Jan. 29, 2025 from U.S. Appl. No. 18/305,822, filed Apr. 29, 2025, 6 pp.

Communication pursuant to Article 94(3) EPC from counterpart European Application No. 23169383.9 dated Sep. 19, 2025, 6 pp.

* cited by examiner

COMBINED CHARGING CONTACT AND ANTENNA FOR HEARING INSTRUMENTS

This application claims the benefit of U.S. Provisional Patent Application No. 63/363,549, filed Apr. 25, 2022, the entire content of which is incorporated herein by reference.

TECHNICAL FIELD

This disclosure relates to antennas for hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for hearing instruments. There are several challenges faced by designers of antennas for hearing instruments. For example, because hearing instruments are primarily worn within the ear canals of users and because components of hearing instruments are typically located within the hearing instruments themselves, the space available for antennas is limited. Moreover, because some types of hearing instruments, such as completely-in-canal (CIC) hearing instruments, are primarily worn within the ear canals of users, the user's head and ear tissue may affect signals received and transmitted by antennas of hearing instruments. Furthermore, many modern hearing instruments have rechargeable batteries. Charging contacts on the surface of a hearing instrument conduct electrical energy from a charging device to a rechargeable battery of the hearing instrument. Like other components of hearing instruments, the charging contacts occupy valuable space within the hearing instrument.

This disclosure describes hearing instruments in which antennas and charging contacts are combined. Combining the antennas and charging contacts may reduce the number of components in the hearing instruments, which may reduce manufacturing complexity and may make space available for the hearing instruments to include other components. In some examples, reducing the number of components may allow for a smaller form factor, which may allow for less noticeable or more comfortable hearing instruments. As described herein, a hearing instrument comprises a housing having an exterior surface and an interior surface. The hearing instrument also includes a rechargeable battery, a first conductor, and a second conductor. The first conductor may have an external segment tracing a first path on the exterior surface of the housing. The second conductor may have an external segment tracing a second path on the exterior surface of the housing. The first conductor and the second conductor are configured to operate as both an antenna and to conduct electricity from a charger to the rechargeable battery.

In one example, this disclosure describes a hearing instrument comprising: a housing having an exterior surface and an interior surface; a rechargeable battery; a first conductor having an external segment tracing a first path on the exterior surface of the housing; a second conductor having an external segment tracing a second path on the exterior surface of the housing, wherein the first conductor and the second conductor are configured to operate as both an antenna and to conduct electricity from a charger to the rechargeable battery.

In another example, this disclosure describes a hearing instrument comprising: a microphone; a housing that defines an opening that leads to the microphone; a button disposed on the housing; and a ring member configured to be disposed within a recess defined in the housing and to define a perimeter around the button, wherein: the ring member defining an acoustic path that has a non-straight segment, the acoustic path has an external port and an internal port, and the internal port is configured to be aligned with the microphone opening of the housing.

The details of one or more techniques of the disclosure are set forth in the accompanying drawings and the description below. Other features, objects, and advantages of the techniques described in this disclosure will be apparent from the description, drawings, and claims.

DETAILED DESCRIPTION

Figure 1:
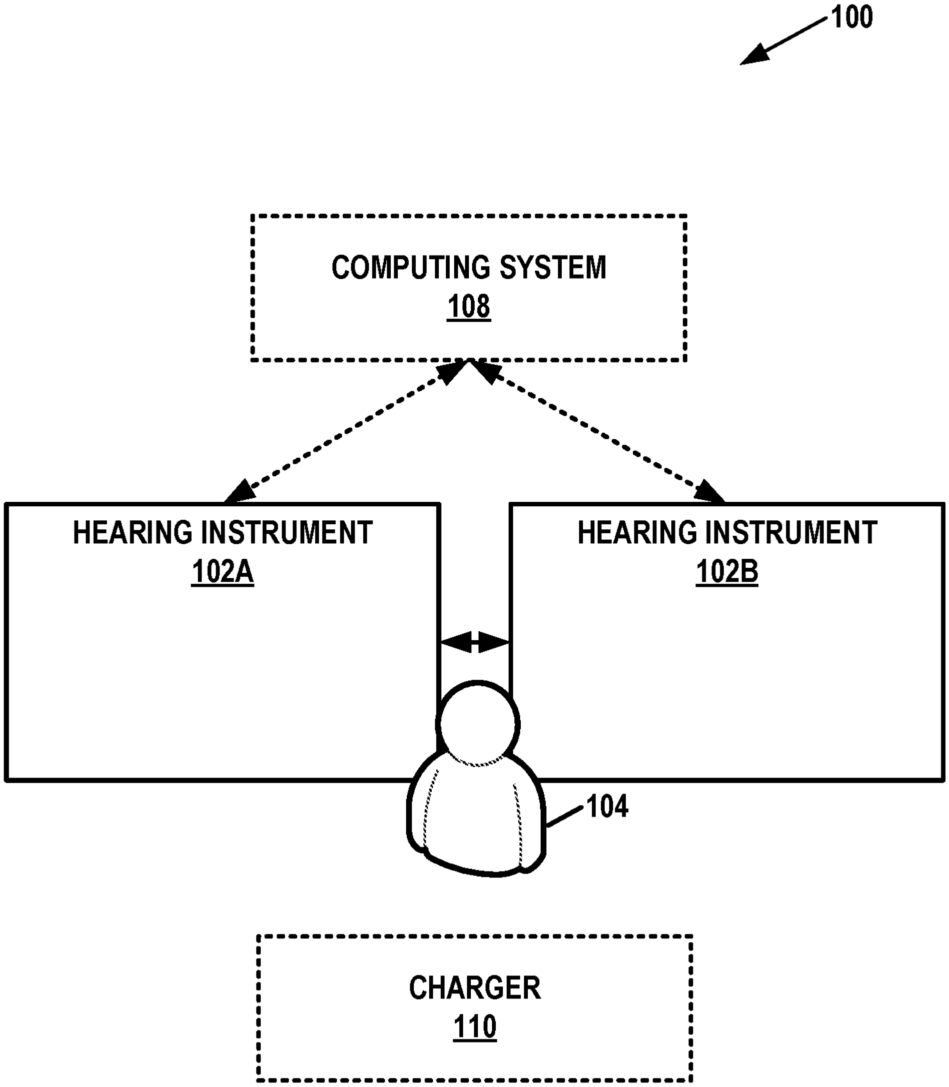
FIG. 1 is a conceptual diagram illustrating an example system that includes one or more hearing instruments, in accordance with one or more techniques of this disclosure.

Wireless communication links are becoming increasingly important for hearing instruments, such as hearing aids. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument requires an antenna to perform wireless communication. In part because of the small sizes of hearing instruments and the limited storage capacities of the batteries of hearing instruments, designing antennas for hearing instruments is challenging. This is especially the case with respect to completely-in-canal (CIC) hearing instruments, In-The-Canal (ITC) hearing instruments, In-The-Ear (ITE) hearing instruments, and Invisible-In-The-Canal (IITC) hearing instruments. Because such hearing instruments are compact in size and may be fully located inside a user's ear or ear canal, antennas for such hearing instruments may suffer from head loading. Head loading is the attenuation of electromagnetic signals by the user's head. The problem of head loading may be especially pronounced in 2.4 GHz antennas used for Bluetooth Low Energy (BLE) radio applications. This disclosure describes antennas suitable for use in hearing instruments, such as CIC hearing instruments, ITC hearing instruments, ITE hearing instruments, IITC hearing instruments, and other types of hearing instruments. For example, the antenna designs of the disclosure may be suitable for use in hearing instruments with BLE radio applications in the 2.4 GHz band.

Many hearing instruments include rechargeable batteries that are enclosed within housings of the hearing instruments. Two or more charging contacts on an exterior surface of a housing of a hearing instrument may interface with corresponding charging terminals of a charger to conduct electricity from the charger to conductors leading to a rechargeable battery of the hearing instrument. The charging contacts and associated conductors occupy valuable space on the exterior surface of the housing of the hearing instrument and within the housing of the hearing instrument.

This disclosure describes techniques that may address these issues. As described herein, a hearing instrument includes a housing having an exterior surface and an interior surface. The hearing instrument also includes a rechargeable battery. Additionally, the hearing instrument includes a first conductor that traces a first path on the exterior surface of the housing and a second conductor that traces a second path on the exterior surface of the housing. The first conductor and the second conductor are configured to operate as both an antenna and to conduct electricity from a charger to the rechargeable battery. Because the first conductor and the second conductor operate as both an antenna and conduct electricity from the charger to the rechargeable battery, the number of components in the hearing instrument, the form factor of the hearing instrument, and/or the complexity of manufacturing the hearing instrument may be reduced. Additionally, because the first conductor and the second conductor are located on the exterior surface of the housing, where there is less head loading, the antenna may be better configured to operate in the 2.4 GHz band relative to other antenna designs that include antenna radiating elements that are primarily within an internal cavity defined by the housing. At the same time, this antenna design may be less vulnerable to damage than antennas having one or more antenna radiating elements in hearing instrument pull cords.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each ear of the user.

Hearing instruments 102 may comprise one or more of various types of devices that are configured to provide auditory stimuli to a user and that are designed for wear and/or implantation at, on, or near an ear of the user. Hearing instruments 102 may be worn, at least partially, in the ear canal or concha. One or more of hearing instruments 102 may include behind the ear (BTE) components that are worn behind the ears of user 104. In some examples, hearing instruments 102 comprise devices that are at least partially implanted into or integrated with the skull of the user. In some examples, one or more of hearing instruments 102 are able to provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to the user that correspond to artificial sounds or sounds that are not naturally in the user's environment, such as recorded music, computer-generated sounds, or other types of sounds. For instance, hearing instruments 102 may include so-called "hearables," earbuds, earphones, or other types of devices. Some types of hearing instruments provide auditory stimuli to the user corresponding to sounds from the user's environmental and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as ITE, ITC, CIC, or IIC devices. In some examples, one or more of hearing instruments 102 may be behind-the-ear (BTE) devices, which include a housing worn behind the ear that contains all of the electronic components of the hearing instrument, including the receiver (i.e., the speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes. In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In some examples of this disclosure, hearing instruments 102 may communicate with each other via non-wireless communication links (e.g., in addition to wireless communication links), such as via one or more cables, direct electrical contacts, and so on.

As shown in the example of FIG. 1, system 100 may also include a computing system 108. In other examples, system 100 does not include computing system 108. Computing system 108 comprises one or more computing devices, each of which may include one or more processors. For instance, computing system 108 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. One or more of hearing instruments 102 may communicate with computing system 108 using wireless or non-wireless communication links. For instance, hearing instruments 102 may communicate with computing system 108 and/or each other using any of the example types of communication technologies described elsewhere in this disclosure.

Furthermore, in the example of FIG. 1, system 100 may include a charger 110. Charger 110 is a device configured to recharge rechargeable batteries of hearing instruments 102. In some examples, charger 110 is a charging case. Charger 110 includes one or more pairs of charging terminals. Each pair of charging terminals is configured to interface with corresponding conductors of hearing instruments 102 that conduct electricity from charger 110 to a rechargeable battery of one of hearing instruments 102.

In accordance with the techniques of this disclosure, one or more of hearing instruments 102 includes a housing having an exterior surface and an interior surface. The hearing instrument also includes a rechargeable battery. Additionally, the hearing instrument includes a first conductor that traces a first path on the exterior surface of the housing and a second conductor that traces a second path on the exterior surface of the housing. The first conductor and the second conductor are configured to operate as both an antenna and to conduct electrical current from a charger to the rechargeable battery.

Figure 2:
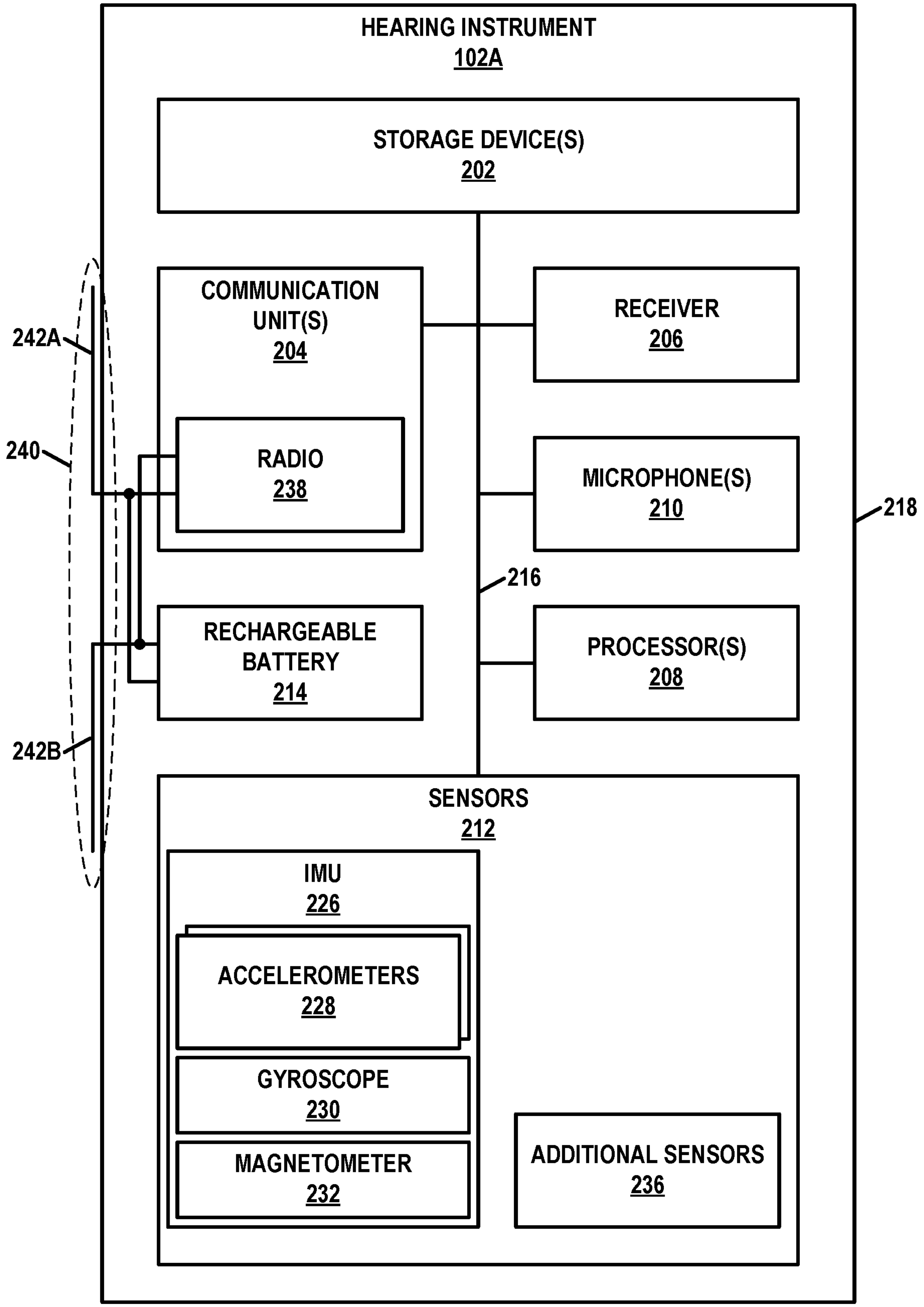
FIG. 2 is a block diagram illustrating example components of a hearing instrument, in accordance with one or more techniques of this disclosure.

FIG. 2 is a block diagram illustrating example components of hearing instrument 102A, in accordance with one or more techniques of this disclosure. Although FIG. 2 is described with respect to hearing instrument 102A, hearing instrument 102B may be implemented in the manner shown in FIG. 2.

In the example of FIG. 2, hearing instrument 200 comprises one or more storage devices 202, one or more communication unit(s) 204, a receiver 206, one or more processor(s) 208, one or more microphone(s) 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Components 202, 204, 206, 208, 210, and 212 may draw electrical power from power source 214. In the example of FIG. 2, each of components 202, 204, 206, 208, 210, 212, 214, and 216 are contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components. In some examples, additional sensors 236 may include sensor circuitry configured to perturbations in antenna performance due to either user 104 touching external segments of the first and second conductors, being in close proximity to the external segments of the first and second conductors, or both.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another types of devices. Communication unit(s) 204 may enable hearing instrument 200 using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

As shown in the example of FIG. 2, communication unit(s) 204 include a radio 238. Radio 238 includes electronic components for generating and receiving electrical signals from an antenna 240. Antenna 240 may be implemented in accordance with any of the example antenna designs described in this disclosure, such as the antenna designs described with respect to FIG. 3 through FIG. 7. In the example of FIG. 2, antenna 240 includes a conductor 242A (e.g., a first conductor) and a conductor 242B (e.g., a second conductor) on an exterior surface of housing 218. This disclosure may refer to conductor 242A and conductor 242B collectively as "conductors 242." Antenna 240 may be a dipole antenna, conductor 242A and conductor 242B may be a first arm and a second part of the dipole antenna.

In accordance with one or more techniques of this disclosure, conductors 242 are also connected to rechargeable battery 214. Because conductors 242 are connected to rechargeable battery 214, conductors 242 may conduct electricity from charger 110 (FIG. 1) to rechargeable battery 214 during charging. Thus, conductor 242A and conductor 242B may be configured to operate as both antenna 240 and also to conduct electricity from charger 110 to rechargeable battery 214.

Receiver 206 comprises one or more speakers for generating audible sound. Microphone(s) 210 detects incoming sound and generates one or more electrical signals (e.g., an analog or digital electrical signal) representing the incoming sound.

Processor(s) 208 may be processing circuits configured to perform various activities. For example, processor(s) 208 may process the signal generated by microphone(s) 210 to enhance, amplify, or cancel-out particular channels within the incoming sound. Processor(s) 208 may then cause receiver 206 to generate sound based on the processed signal. In some examples, processor(s) 208 include one or more digital signal processors (DSPs). In some examples, processor(s) 208 may cause communication unit(s) 204 to transmit (e.g., via radio 238 and antenna 240) one or more of various types of data. For example, processor(s) 208 may cause communication unit(s) 204 to transmit data to computing system 108. Furthermore, communication unit(s) 204 may receive audio data from computing system 108 and processor(s) 208 may cause receiver 206 to output sound based on the audio data.

Figure 3:
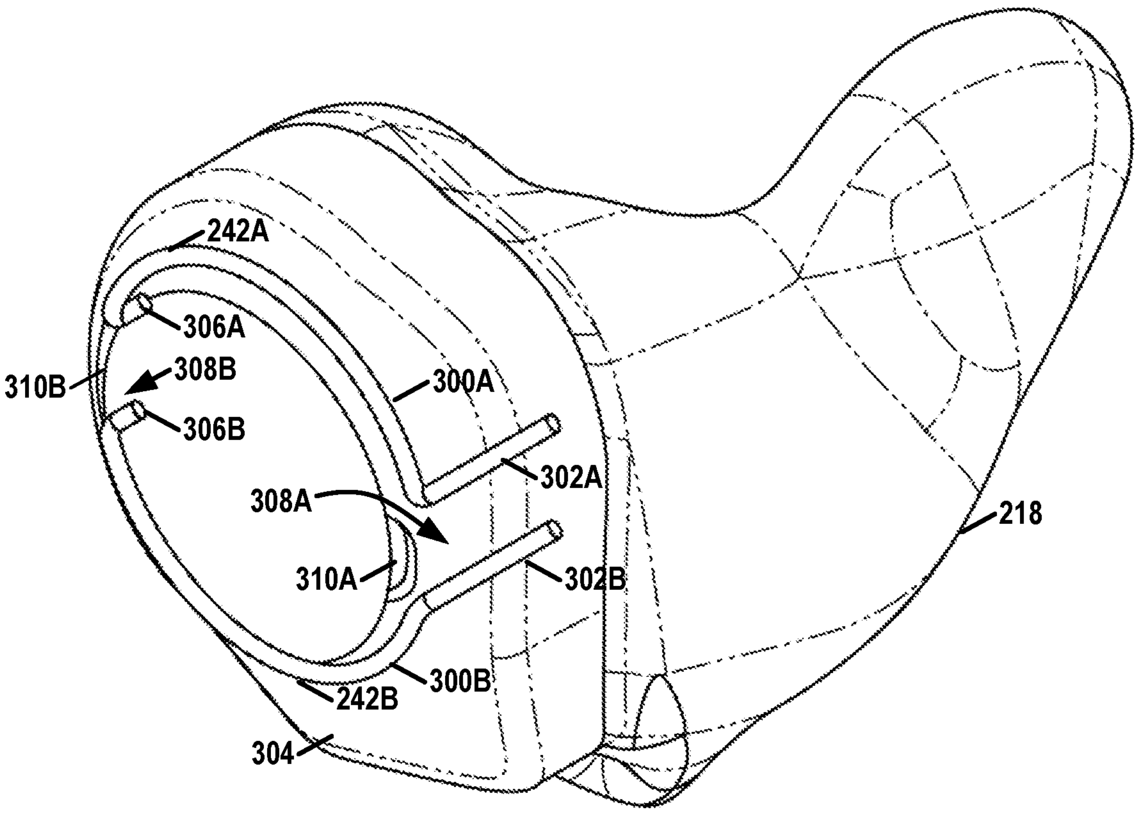
FIG. 3 is a conceptual diagram illustrating an example hearing instrument, in accordance with one or more techniques of this disclosure.

FIG. 3 is a conceptual diagram illustrating an example hearing instrument 102A, in accordance with one or more techniques of this disclosure. Although FIG. 3 is described with respect to FIG. 1 and FIG. 2, the description of FIG. 3 is not so limited. Hearing instrument 102B may be similar to hearing instrument 102A shown in the example of FIG. 3.

In the example of FIG. 3, hearing instrument 102A includes housing 218, conductor 242A, and conductor 242B. Housing 218 is shown in FIG. 3 as being partially transparent to show internal portions of conductors 242. Conductors 242A, 242B include external segments 300A, 300B (collectively, "external segments 300"), and internal segments 302A, 302B (collectively, "internal segments 302"), respectively. External segments 300 traces paths on a lateral exterior surface 304 of housing 218. Thus, conductors 242 may be on a lateral side of housing 218 furthest from a sagittal midline plane of user 104 when user 104 wears hearing instrument 102A. External segments 300 may sit flush with lateral exterior surface 304 of housing 218, be raised somewhat relative to lateral exterior surface 304 of housing 218, or may be recessed somewhat relative to lateral exterior surface 304 of housing 218.

Internal segments 302 extend into an interior cavity defined by housing 218. Internal segments 302 may be connected to radio 238 and components for recharging rechargeable battery 214 (FIG. 2). In the example of FIG. 3, conductors 242A, 242B have terminal segments 306A, 306B (collectively, "terminal segments 306") that are oriented inward toward the interior cavity defined by housing 218. Terminal segments 306 may help to secure external segments 300 to housing 218.

Because external segments 300 trace paths on lateral exterior surface 304, and lateral exterior surface 304 is furthest from the center of the head of user 104, external segments 300 may experience less head loading than antenna segments positioned elsewhere in hearing instrument 102. Reducing head loading may improve the ability of the antenna to communicate with other devices and may reduce power consumption, especially in the 2.4 GHz band. In other words, a plane of external segments 300 may be located on or in the portion of hearing instrument 102A with a maximum distance from the head and ear of user 104. At Ultra High Frequency (UHF) and higher frequencies, the human ear and head absorbs RF energy, which typically occurs in antennas in close proximity to the head and ear having significantly reduced antenna efficiency. Distancing conductors 242 as far as practical from the head and ear of user 104 may reduce the proximal loss effects to antenna 240 and may lead to improved antenna performance. Furthermore, losses associated with signals radiating through housing 218 (which may include a faceplate) are reduced or avoided because external segments 300 are on an exterior surface of housing 218.

In the example of FIG. 3, external segments 300 have opposing curvilinear shapes defining arcs of a circle. Because external segments 300 have curvilinear shapes, the electrical length of external segments 300 is increased relative to a device having external segments that are straight. Conductors 242 may have the same electrical and/or physical lengths. In other examples, external segments 300 have curvilinear shapes defining an ellipse. External segments 300 may have rotational symmetry. In other words, external segments 300 may appear to be same after rotating external segments 300 by a partial turn, such as 180 degrees.

Antenna 240 may be a UHF or a Super High Frequency (SHF) antenna and may use conductors 242 as antenna radiating elements of a dipole antenna. Conductors 242 may use be oriented in a split-ring configuration, of which the fed end, and the distal end of conductors 242 may bend to pass through a face plate of hearing instrument 102A and provide connection to circuitry interior to housing 218.

The charging terminals of charger 110 may extend, in a radial direction from a midpoint between the charging terminals of charger 110, to cover areas of charger 110 that include points separated by a distance equal to a diameter of the circle defined by the arcs of external segments 300. Thus, external segments 300 may be able to contact the charging terminals of charger 110 for most angles of rotation of hearing instrument 102A relative to charger 110. For instance, user 104 may insert hearing instrument 102A into a cavity of charger 110 containing the charging terminals of charger 110 at any angle aside from an angle where the charging terminals of charger 110 align with gaps 308A, 308B (collectively, "gaps 308") at the distal and proximal ends of external segments 300. In some examples, features (e.g., ridges, protrusions, magnets, etc.) on housing 218 and/or charger 110 may help to prevent user 104 from inserting hearing instrument 102A into the cavity of charger 110 at an angle where the charging terminals of charger 110 align with gaps 308.

Charger 110 and/or hearing instrument 102A may include circuitry to remove sensitivity to polarity to the charging terminals of charger 110. For instance, the charging terminals of charger 110 may switch between positive and negative polarity to accommodate hearing instrument 102A if rotated by 180 degrees.

In the example of FIG. 3, housing microphone ports 310A, 310B (collectively, "microphone ports 310") are positioned at gaps 308. Microphone ports 310 may also be referred to as "microphone acoustic paths." The positioning of microphone ports 310 in gaps 308 may contribute to a more homogenous design.

Figure 4:
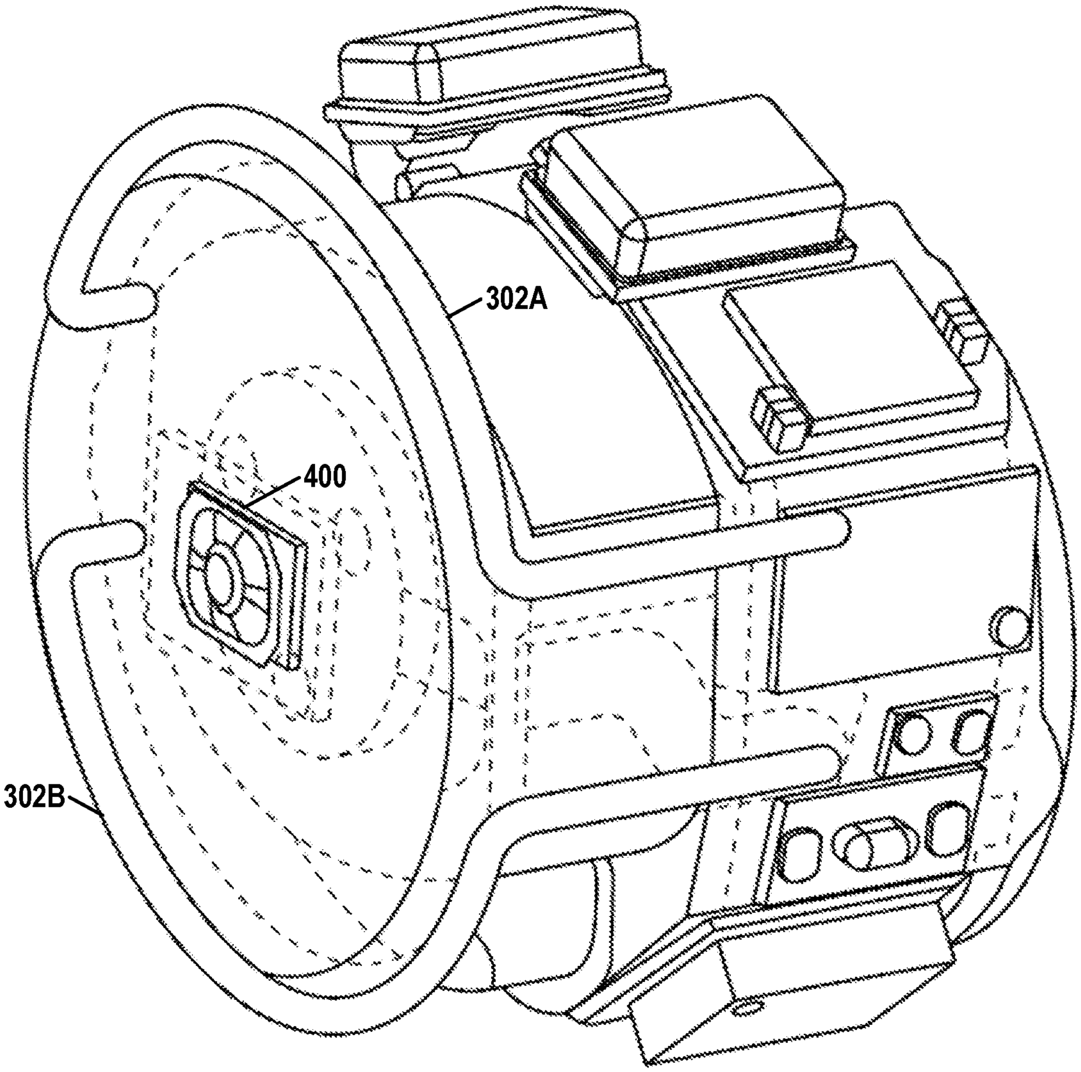
FIG. 4 is a conceptual diagram illustrating example components of a hearing instrument without a housing, in accordance with one or more techniques of this disclosure.

FIG. 4 is a conceptual diagram illustrating example components of hearing instrument 102A without housing 218, in accordance with one or more techniques of this disclosure. In the example of FIG. 4, hearing instrument 102A includes a capacitive touch button 400. Capacitive touch button 400 may be located at a center of a circle defined by external segments 300. Capacitive touch button 400 may be configured to detect changes in capacitance associated with user 104 touching the portion of housing 218 in the circle defined by external segments 300. Hearing instrument 102A may perform various actions in response to detecting such as touch. For example, hearing instrument 102A may change a volume level, toggle noise canceling, change to a different hearing profile, start or pause streaming of media, and so on.

In some examples, hearing instrument 102A may include sensing circuitry (e.g., in radio 238) to detect perturbations in antenna performance due to either user 104 touching external segments 300, being in close proximity to external segments 300, or both. For instance, hearing instrument 102A may be configured to periodically emit pulses of radiofrequency (RF) energy, even if hearing instrument 102A is not communicating with another device. Antenna 240 may exhibit different impedance depending on whether a finger of user 104 is touching or proximate external segments 300. The sensing circuitry may detect such changes in impedance, and thereby determine whether the finger of user 104 is touching or proximate external segments 300 of antenna 240. In some examples, the sensing circuitry may determine whether user 104 is touching or proximate external segments 300 indirectly via transmitter or receive secondary effects. In such examples, the secondary effects may include changes in RF transmitter current drain due to load-pull variations. In some examples, the secondary effects may include changes to a sensed reflection-coefficient of antenna 240 when in transmit. In a frequency-hopped system, the sensing circuitry may detect such changes to the sensed reflection-coefficient of antenna 240 on a per-operating channel basis to better discern environmental changes attributable to touch or proximity from changes due to operating frequency/channel changes.

FIGS. 5A-5F are conceptual diagrams illustrating exploded views of example components of a hearing instrument 500 that includes a housing 501 and a button 502, in accordance with one or more techniques of this disclosure. Hearing instrument 500 may be an example of either of hearing instruments 102. Hearing instrument 500 includes tactile feedback button 502. Button 502 may be a capacitive button, a mechanical button, or other type of button. Button 502 may be positioned within the arcs defined by external portions of conductors 504A, 504B (collectively, "conductors 504"). A user may use button 502 to control on or more features or parameters of hearing instrument 500. For example, hearing instrument 500 may change a volume gain, change a noise cancelation level, initiate a communication session, or perform other actions in response to detecting one or more activations of button 502. In some examples, button 502 may be configured to provide tactile feedback, such as a vibration, in response to being activated. In other examples, button 502 (or other part of hearing instrument 500) does not provide tactile feedback in response to activation of button 502.

Figure 5A:
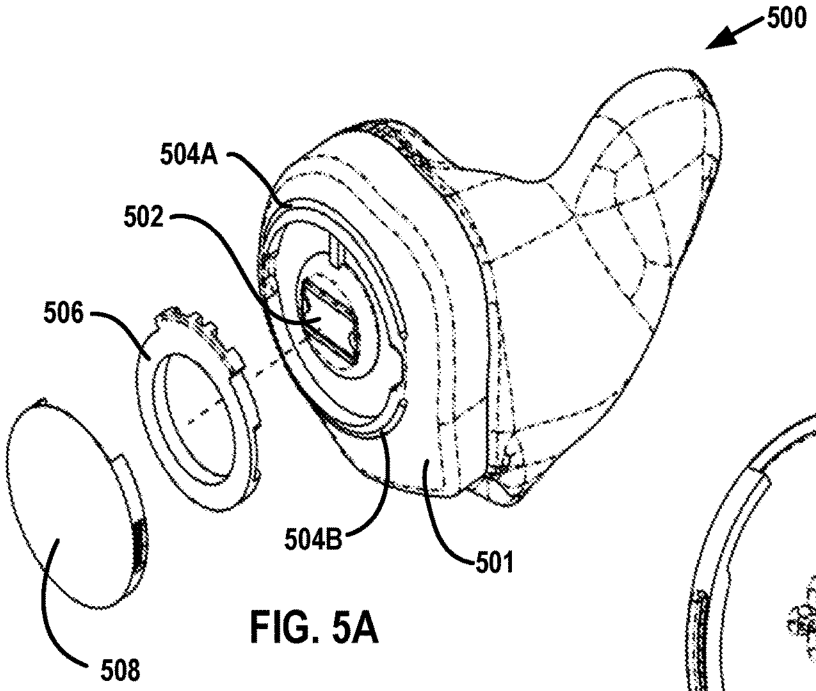
FIGS. 5A-5C are conceptual diagrams illustrating exploded views of example components of a hearing instrument that includes a tactile feedback switch, in accordance with one or more techniques of this disclosure.
Figure 5B:
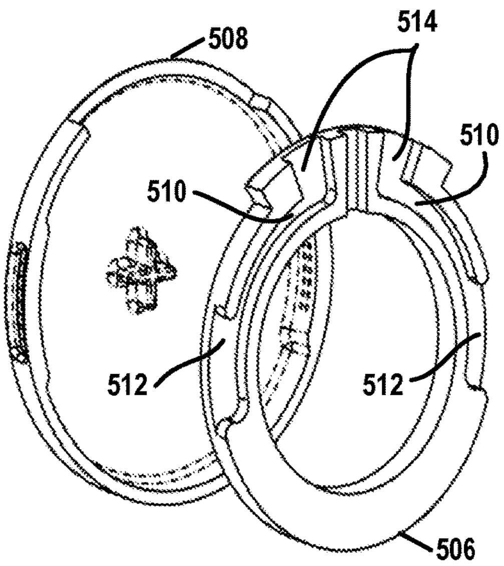
Figure 5C:
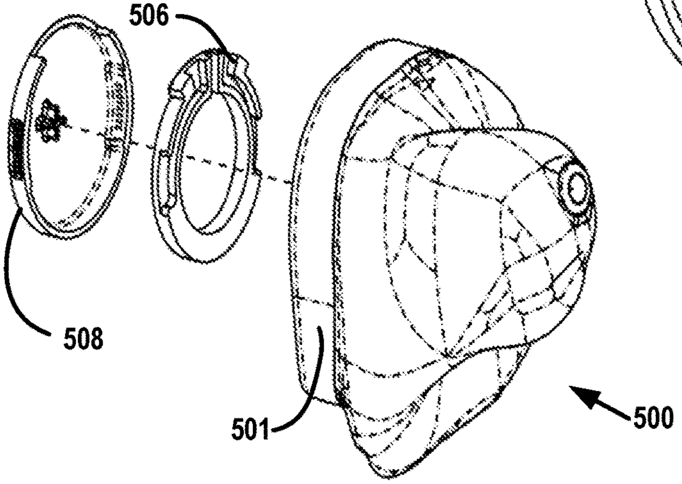

In the examples of FIGS. 5A-5F, a ring member 506 and a button cover 508 may be attached to the area of hearing instrument 500 defined by the arcs of the external portions of conductors 504. Ring member 506 defines acoustic paths 510 that allow sound to travel from external microphone ports 512 to microphones located within hearing instrument 500. Sounds entering acoustic paths 510 via external microphone ports 512 may exit acoustic paths 510 through internal microphone ports 514. Internal microphone ports 514 may be aligned with openings in a housing that leads to the microphones. External microphone ports 512 may be positioned in the gaps at the ends of the external portions of conductors 504. FIG. 5B shows ring member 506 and button cover 508 in isolation from a reverse perspective of FIG. 5A. FIG. 5C shows hearing instrument 500 from a reverse perspective of FIG. 5A. In some examples, button cover 508 and/or ring member 506 are removable from hearing instrument 500 to allow for clearing of acoustic paths 510 to one or more microphones of hearing instrument 500. Button cover 508 may be a flexible dome or membrane that covers button 502.

As shown in FIG. 5B, acoustic paths 510 do not define a straight path from external microphone ports 512 to internal microphone ports 514. Rather, acoustic paths 510 define convoluted paths from external microphone ports 512 to internal microphone ports 514. This may reduce the opportunities for debris to enter the housing via acoustic paths 510. Additionally, because acoustic paths 510 are defined in ring member 506 and do not traverse the area underneath button cover 508, the acoustic characteristics of sound traveling through acoustic paths 510 does not change, regardless of whether the user is or is not depressing button cover 508. In other words, dimensions of acoustic paths 510 may remain consistent regardless of whether button cover 508 is in a depressed state.

Figure 5D:
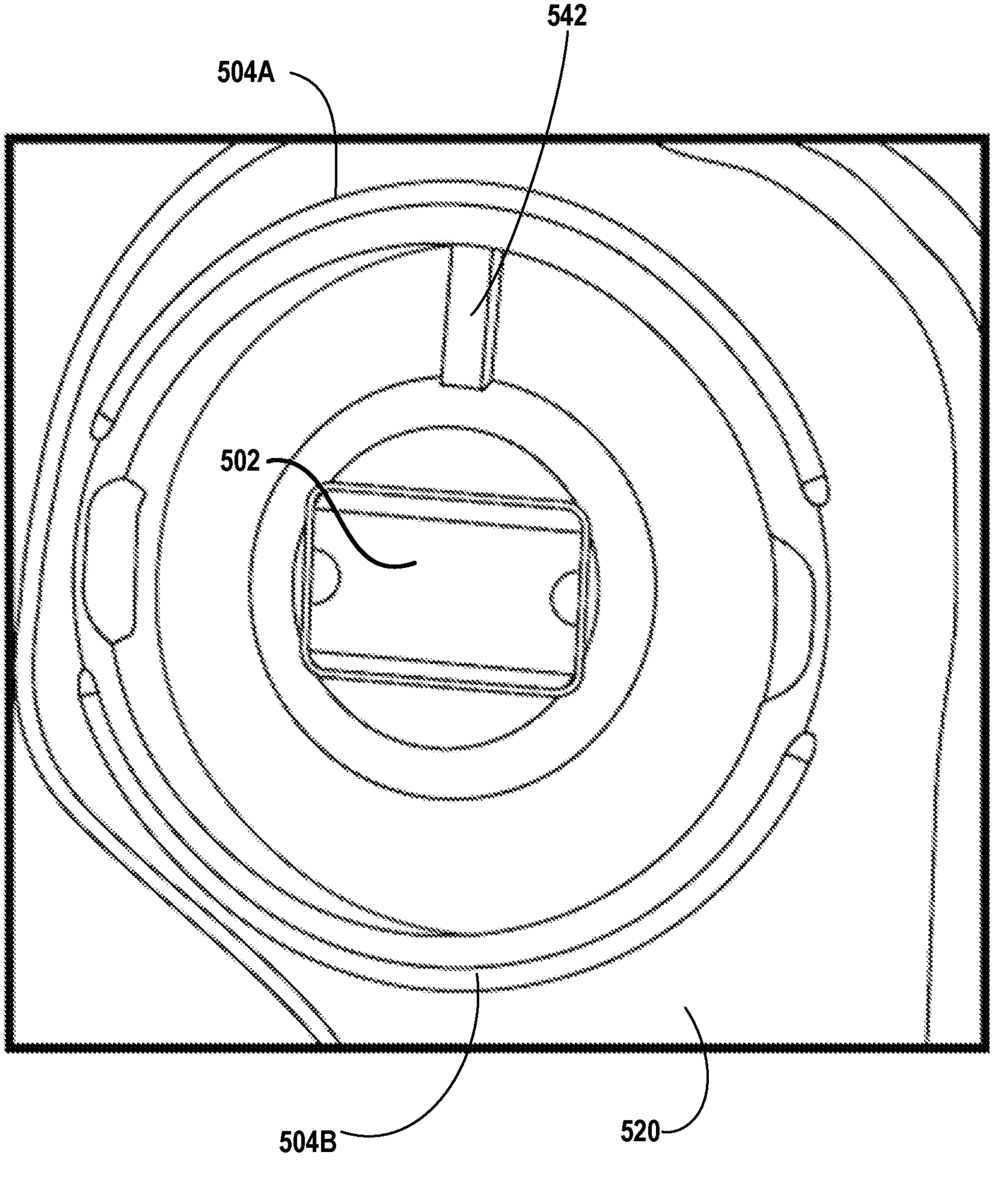
FIG. 5D is a conceptual diagram illustrating a medial view of example faceplate of a hearing instrument in accordance with one or more techniques of this disclosure.

FIG. 5D is a conceptual diagram illustrating a medial view of example faceplate 520 of hearing instrument 500 in accordance with one or more techniques of this disclosure. Faceplate 520 may form part of housing 501. The medial view is looking toward a midline of a user when the user is wearing hearing instrument 500.

Figure 5E:
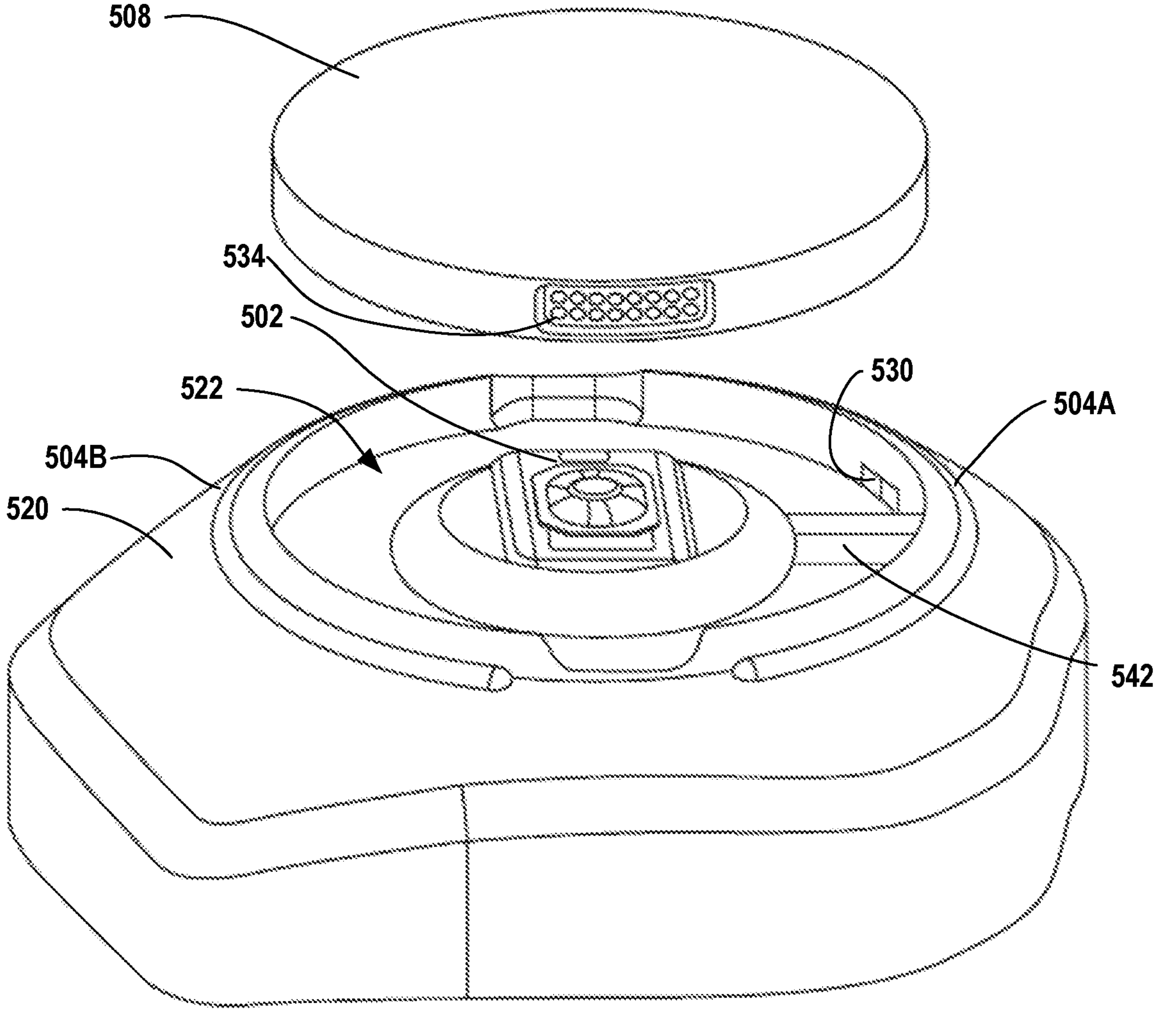
FIG. 5E is a conceptual diagram illustrating an exploded view of a hearing instrument in accordance with one or more techniques of this disclosure.

FIG. 5E is a conceptual diagram illustrating an exploded view of hearing instrument 500 in accordance with one or more techniques of this disclosure. In the example of FIG. 5E, an opening 530 in faceplate 520 may be aligned with one of internal microphone ports 514 of ring member 506 (ring member 506 is not shown in FIG. 5E). Opening 530 may lead to a microphone contained within hearing instrument 500. Another corresponding opening in faceplate 520 not shown in FIG. 5E may lead to the microphone or another microphone contained within hearing instrument 500.

Furthermore, FIG. 5E shows that button cover 508 may include a mesh 534 designed to prevent debris from entering one of acoustic paths 510 while allowing sound to enter the acoustic path. Mesh 534 may be aligned with an external microphone port of the acoustic path. Another mesh on the other side of button cover 508 may prevent debris from entering the other acoustic path.

In other examples, a removable basket member (not shown) may be used in place of mesh 534. The removable basket member may include a mesh to prevent ingress of debris, but the removable basket member may be removable from button cover 508. Alternatively, the removable basket member may be removably attached to ring member 506. The ability to remove the removable basket member may enable the user to clean or replace the removable basket member if the mesh of the removable basket member becomes clogged.

Figure 5F:
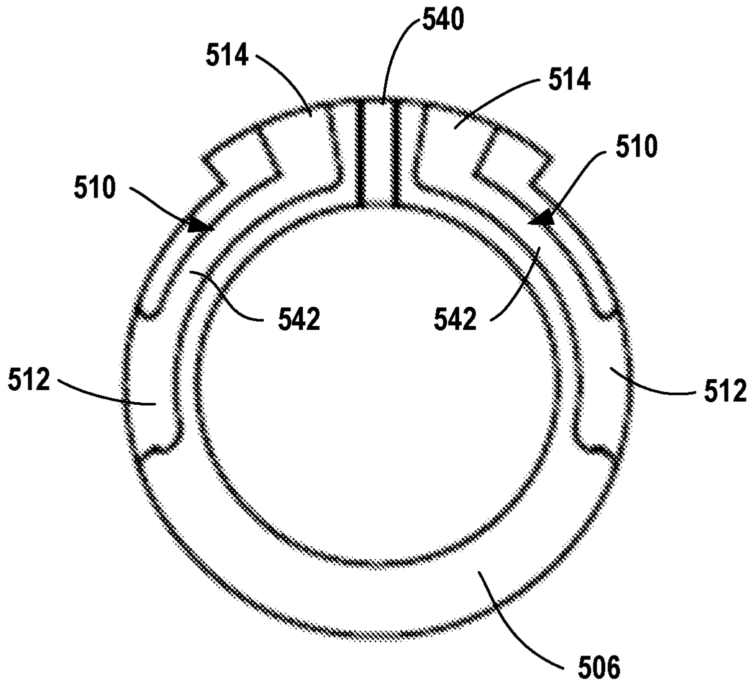
FIG. 5F is a conceptual diagram illustrating an example of a ring component in accordance with one or more techniques of this disclosure.

FIG. 5F is a conceptual diagram illustrating an example of ring component 506 in accordance with one or more techniques of this disclosure. FIG. 5F shows that acoustic paths 510 include non-straight (e.g., arcuate, curved, including one or more corners, etc.) segments between external microphone ports 512 and internal microphone ports 514. In the example of FIG. 5F, the non-straight segments are arcuate segments 542. The non-straight segments may be in a plane that is substantially orthogonal to a direction for depressing button 502. Additionally, ring component 506 defines an alignment slot 540 configured to engage an alignment ridge 542 (FIG. 5E) of housing 501 so as to prevent rotation of ring member 506 within recess 522 defined by housing 501. In some examples, ring member 506 is not round, but may have other shapes, such as an oval shape, rectilinear shape, pentagonal shape, or other shape.

Thus, in the examples of FIGS. 5A-5F, hearing instrument 500 includes a microphone (e.g., microphone 210 of FIG. 2), a housing 501 that defines an opening that leads to the microphone. Hearing instrument 500 also includes a button 502 disposed on housing 501. Ring member 506 is configured to be disposed within a recess 522 defined in housing 501. Ring member 506 may define a perimeter around button 502. Ring member 506 defines an acoustic path (e.g., one of acoustic paths 510) that has a non-straight segment (e.g., one of arcuate segments 542). The acoustic path has an external port (e.g., one of external microphone ports 512) and an internal port (e.g., one of internal microphone ports 514). The internal port is configured to be aligned with the microphone opening (e.g., opening 530) of housing 501. Button cover 508 may disposed on hearing instrument 500 to cover button 502 and ring member 506. Button cover 508 may define one or more openings 534 corresponding to the external port of ring member 506. Button cover 508 may include a mesh that defines the one or more openings. Alternatively, a basket may be removably disposed in one of the openings defined in button cover 508, where the basket defines one or more openings.

Figure 6:
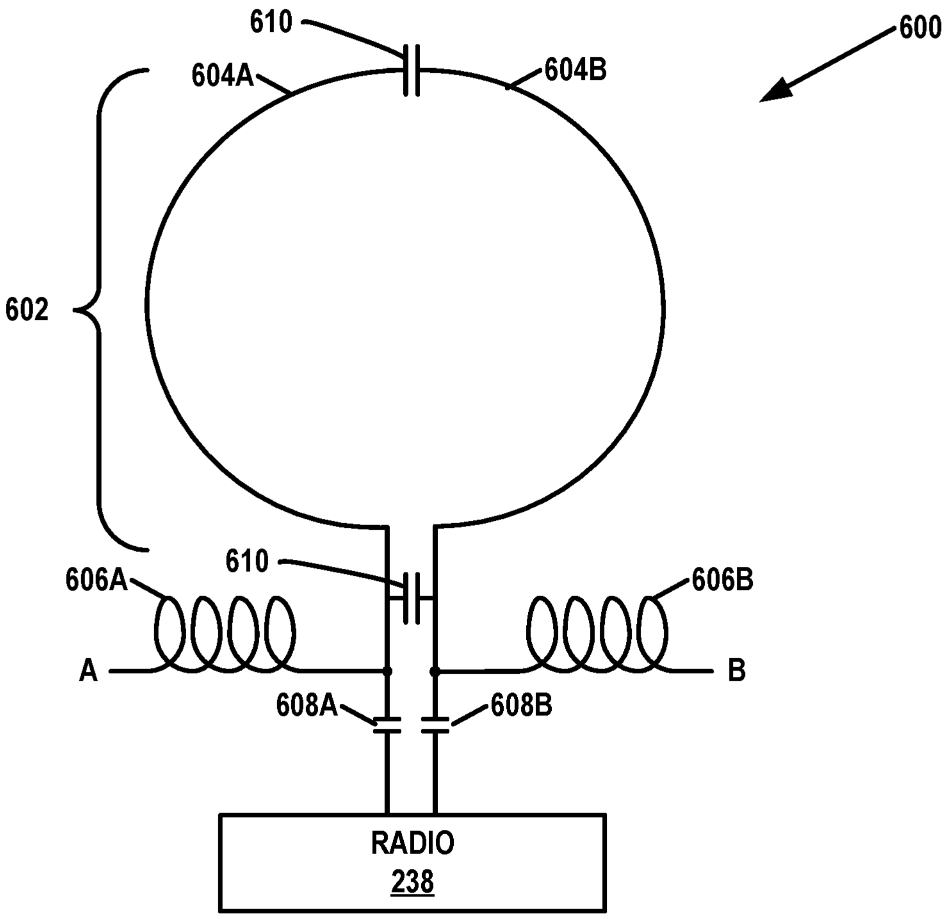
FIG. 6 is a conceptual diagram illustrating a first example system that includes an antenna in accordance with one or more techniques of this disclosure.

FIG. 6 is a conceptual diagram illustrating a first example system 600 that includes an antenna 602 in accordance with one or more techniques of this disclosure. Antenna 602 includes conductors 604A, 604B (collectively, "conductors 604"). In the example of FIG. 6, "A" and "B" denote DC charging inputs to rechargeable battery 214. Furthermore, system 600 includes inductors 606A, 606B (collectively, "inductors 606") and capacitors 608A, 608B (collectively, "capacitors 608"). Inductors 606 are positioned between the direct current (DC) charging inputs of rechargeable battery 214 and antenna 602. Capacitors 608 are positioned between radio 238 and antenna 602. In some examples, inductors 606 are 56-nano-Henry (nH) chip inductors or inductors that have high impedance at a radiofrequency of operation. In some examples, such as examples where antenna operates at 2.4 GHz, capacitors 608 may be 15 picoFarads (pF) or less. For instance, capacitors 608 may be 10-picoFarad (pF) capacitors. In some examples, capacitors 608 may have capacitance values sufficient to cause capacitors 608 to function as a DC block and to function as part of an impedance matching network. A portion of the impedance matching network may be included in radio 238. In some examples where capacitors 608 function as part of an impedance matching network, capacitors 608 may have capacitances of 10 pF or less, which may depend on feed point impedance of antenna 602. In some examples, the impedance matching network may contain other inductors and capacitors in addition to the DC blocking capacitors (e.g., capacitors 608). The additional inductors and capacitors may be considered within radio 238.

Inductors 606 and capacitors 608 may be part of a diplexer circuit in which inductors 606 isolate high frequency signals (which associated with Ultra High Frequency (UHF) or higher RF transmission and reception) and capacitors 608 isolate low frequency signals (which are associated with DC or low-frequency charging currents). Inductors 606 may act as an open circuit for RF signals, and capacitors 608 may act as an open circuitry to the DC/low-frequency charging circuitry. Additionally, inductors 606 may act as a DC/low-frequency connection for charging, and capacitors 608 may act as a RF connection to RF impedance matching and transceiver circuitry of radio 238. The diplexer circuit may act as a DC block (open circuit) while acting as a short for RF (or alternatively, as a series impedance matching circuit component). In some examples, inductors 606 may act as an RF choke (open circuit) while also a DC short for conducting charging current. In some examples, inductors 606A, 606B may have a lower value inductance (below 56 nH) allowing inductors 606A, 606B to exhibit a lower inductive reactance, and thereby be a portion of the antenna impedance matching circuit as well.

Thus, conductor 604A has an internal segment that connects the external segment of conductor 604A to capacitor 608A. Capacitor 608A is connected to radio 238. Conductor 604B has an internal segment that connects the external segment of conductor 604B to capacitor 608B. Capacitor 608B is connected to radio 238. Inductor 606A is connected the internal segment of conductor 604A and components for recharging rechargeable battery 214 and. Inductor 606B may be connected to the internal segment of conductor 606B and components for recharging rechargeable battery 214. Capacitors 608A, 608B and inductors 606A, 606B may be part of a diplexer circuit.

Furthermore, in the example of FIG. 6, system 600 includes a capacitor 610 that connects locations on the radio side of antenna 602 and on the antenna side of capacitors 608. The non-radio side of antenna is a portion of antenna 602 distal to radio 238 and beyond inductors 608. Capacitor 610 may serve as a component of an impedance matching network. In some examples, capacitor 610 is omitted from system 600.

Figure 7:
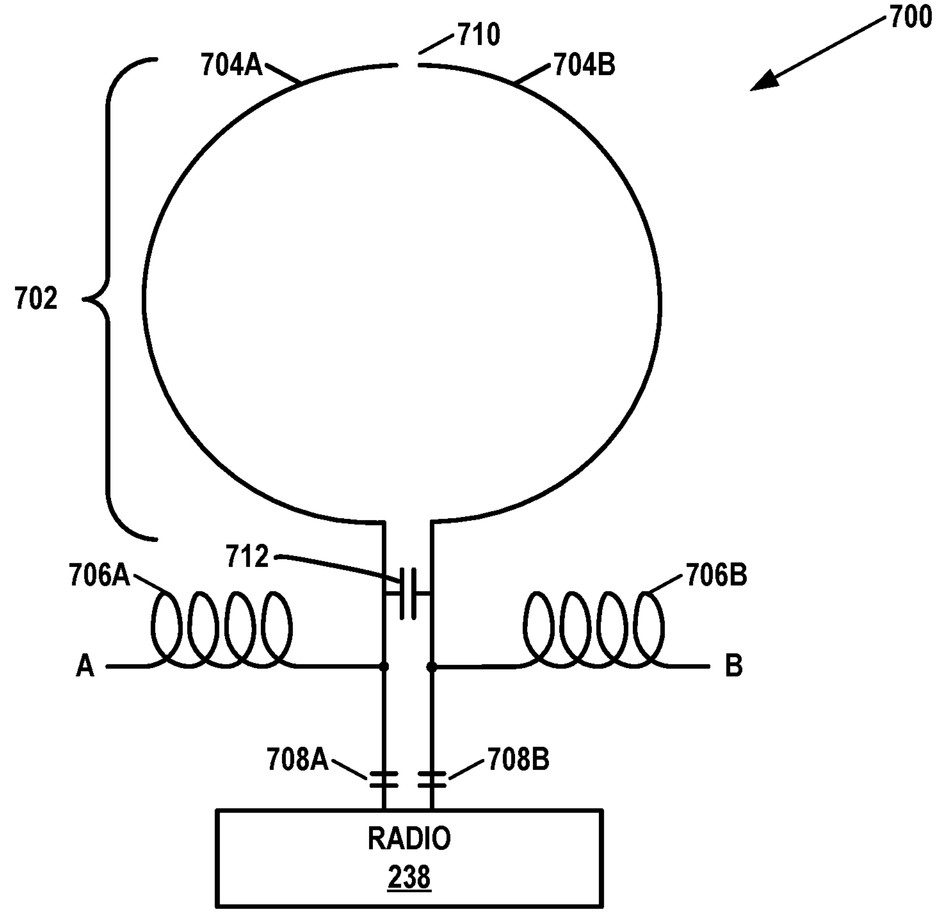
FIG. 7 is a conceptual diagram illustrating a second example system that includes an antenna in accordance with one or more techniques of this disclosure.

FIG. 7 is a conceptual diagram illustrating a second example system 700 that includes an antenna 702 in accordance with one or more techniques of this disclosure. Antenna 702 includes conductors 704A, 704B (collectively, "conductors 704"). In the example of FIG. 7, "A" and "B" denote DC charging inputs for recharging rechargeable battery 214. Furthermore, system 700 includes inductors 706A, 706B (collectively, "inductors 706") and capacitors 708A, 708B (collectively, "capacitors 708"). Inductors 706 are positioned between the DC charging inputs for recharging rechargeable battery 214 and antenna 702. Capacitors 708 are positioned between radio 238 and antenna 702. Inductors 706 and capacitors 708 may be implemented and may operate in the same manner as inductors 506 and capacitors 508 described above. In some examples, inductors 706 may have a lower value inductance (below 56 nH) allowing inductors 706 to exhibit a lower inductive reactance, and thereby be a portion of the antenna impedance matching circuit as well.

In the example of FIG. 7, antenna 702 also includes a RF capacitor 710. RF capacitor 710 connects the distal ends of conductors 704. The distal ends of conductors 704 are distal to the antenna feed (e.g., a portion of antenna 702 connected to radio 238). RF capacitor 710 may tune antenna 702. In some examples, RF capacitor 710 may tune antenna 702 to operate as a loop antenna instead of a dipole antenna. Thus, in the example of FIG. 7, antenna 702 may be a loop antenna and a hearing instrument may further comprise capacitor 710 connected to distal ends of conductor 704A and conductor 704B. The distal ends of conductor 704A and conductor 704B are opposite feed points of conductor 704A and conductor 704B.

Furthermore, in the example of FIG. 7, system 700 includes a capacitor 712 that connects locations on the non-radio side of antenna 702. The non-radio side of antenna is a portion of antenna 702 distal to radio 238 and beyond inductors 708. Capacitor 712 may have a capacitance of 10 pF or less. Capacitor 712 may serve as a shunt capacitive impedance matching element. Capacitor 712 may serve as a component of an impedance matching network. In some examples, capacitor 712 is omitted from system 700.

The following is a non-limiting list of clauses describing examples of this disclosure.

Clause 1A. A hearing instrument comprising: a housing having an exterior surface and an interior surface; a rechargeable battery; a first conductor having an external segment tracing a first path on the exterior surface of the housing; and a second conductor having an external segment tracing a second path on the exterior surface of the housing, wherein the first conductor and the second conductor are configured to operate as both an antenna and to conduct electricity from a charger to recharge the rechargeable battery.

Clause 2A. The hearing instrument of clause 1A, wherein the antenna is a dipole antenna and the first conductor and the second conductor are a first arm and a second arm of the dipole antenna.

Clause 3A. The hearing instrument of clause 1A, wherein: the antenna is a loop antenna, and the hearing instrument further comprises a capacitor connected to distal ends of the first conductor and the second conductor, the distal ends of the first conductor and the second conductor being opposite feed points of the first conductor and the second conductor.

Clause 4A. The hearing instrument of any of clauses 1A-3A, wherein the first conductor and the second conductor have opposing curvilinear shapes defining arcs of a circle or ellipse.

Clause 5A. The hearing instrument of any of clauses 1A-4A, wherein the first conductor and the second conductor have rotational symmetry.

Clause 6A. The hearing instrument of any of clauses 1A-5A, wherein the antenna is a 2.4 GHz antenna.

Clause 7A. The hearing instrument of any of clauses 1A-6A, wherein the external segments of the first conductor and the second conductor are flush with the exterior surface of the housing.

Clause 8A. The hearing instrument of any of clauses 1A-7A, wherein the first conductor and the second conductor are on a lateral side of the housing furthest from a sagittal midline plane of a user of the hearing instrument when the user is wearing the hearing instrument.

Clause 9A. The hearing instrument of any of clauses 1A-8A, wherein: the first conductor and the second conductor have opposing curvilinear shapes defining arcs of a circle or ellipse, and the hearing instrument further comprises a button within the circle or ellipse, wherein the button is a capacitive or mechanical button.

Clause 10A. The hearing instrument of clause 9A, further comprising a button cover that covers the button, wherein the button cover is removable to allow cleaning of acoustic paths to one or more microphones of the hearing instrument.

Clause 11A. The hearing instrument of any of clauses 1A-10A, further comprising sensing circuitry configured to detect perturbations in antenna performance due to either a user touching the external segments of the first and second conductors, being in close proximity to the external segments of the first and second conductors, or both.

Clause 12A. The hearing instrument of any of clauses 1A-11A, wherein the housing defines acoustic ports located between the external segment of the first conductor and the external segment of the second conductor.

Clause 13A. The hearing instrument of any of clauses 1A-12A, wherein: the hearing instrument comprises a radio, a first inductor, and a second inductor, the first conductor has an internal segment that connects the external segment of the first conductor to a first capacitor, wherein the first capacitor is connected to the radio, the second conductor has an internal segment that connects the external segment of the second conductor to a second capacitor, wherein the second capacitor is connected to the radio, the first inductor is connected to the internal segment of the first conductor and components for recharging the rechargeable battery, and the second inductor is connected to the internal segment of the second conductor and the components for recharging the rechargeable battery, wherein the first and second capacitors and the first and second inductors are part of a diplexer circuit.

Clause 1B. A hearing instrument comprising: a microphone; a housing that defines an opening that leads to the microphone; a button disposed on the housing; and a ring member configured to be disposed within a recess defined in the housing and to define a perimeter around the button, wherein: the ring member defining an acoustic path that has a non-straight segment, the acoustic path has an external port and an internal port, and the internal port is configured to be aligned with the microphone opening of the housing.

Clause 2B. The hearing instrument of clause 1B, further comprising a button cover disposed on the hearing instrument to cover the button and the ring member, wherein the button cover defines one or more openings corresponding to the external port of the ring member.

Clause 3B. The hearing instrument of clause 2B, wherein the button cover comprises a mesh that defines the one or more openings.

Clause 4B. The hearing instrument of any of clauses 2B-3B, further comprising a basket removably disposed in one of the openings defined in the button cover, the basket defining one or more openings.

Clause 5B. The hearing instrument of any of clauses 2B-4B, wherein dimensions of the acoustic path remain consistent regardless of whether the button cover is in a depressed state.

Clause 6B. The hearing instrument of any of clauses 2B-5B, wherein the button cover is removable to allow cleaning of the acoustic path.

Clause 7B. The hearing instrument of any of clauses 1B-6B, wherein the non-straight segment is in a plane substantially orthogonal to a direction for depressing the button.

Clause 8B. The hearing instrument of any of clauses 1B-7B, wherein the ring member defines an alignment slot configured to engage an alignment ridge of housing so as to prevent rotation of the ring member within the recess defined by the housing.

Clause 9B. The hearing instrument of any of clauses 1B-8B, wherein the hearing instrument further comprises: a first conductor having an external segment tracing a first path on an exterior surface of the housing; and a second conductor having an external segment tracing a second path on the exterior surface of the housing, wherein the first conductor and the second conductor are configured to operate as both an antenna and to conduct electricity from a charger to recharge the rechargeable battery.

Clause 10B. The hearing instrument of clause 9B, wherein: the first conductor and the second conductor have opposing curvilinear shapes defining arcs of a circle or ellipse on either side of the button, and the external port of the acoustic path is located at a gap between the external segments of the first conductor and the external segment of the second conductor.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A hearing instrument comprising:

a housing having an exterior surface and an interior surface;

a rechargeable battery;

a first conductor having an external segment tracing a first path on the exterior surface of the housing; and a second conductor having an external segment tracing a second path on the exterior surface of the housing, wherein the first conductor and the second conductor are configured to operate together as an antenna and the first conductor and the second conductor are also configured to conduct electricity from a charger to recharge the rechargeable battery.

2. The hearing instrument of claim 1, wherein the antenna is a dipole antenna and the first conductor and the second conductor are a first arm and a second arm of the dipole antenna.

3. The hearing instrument of claim 1, wherein:

the antenna is a loop antenna, and the hearing instrument further comprises a capacitor connected to distal ends of the first conductor and the second conductor, the distal ends of the first conductor and the second conductor being opposite feed points of the first conductor and the second conductor.

4. The hearing instrument of claim 1, wherein the first conductor and the second conductor have opposing curvilinear shapes defining arcs of a circle or ellipse.

5. The hearing instrument of claim 1, wherein the first conductor and the second conductor have rotational symmetry.

6. The hearing instrument of claim 1, wherein the antenna is a 2.4 GHz antenna.

7. The hearing instrument of claim 1, wherein the external segments of the first conductor and the second conductor are flush with the exterior surface of the housing.

8. The hearing instrument of claim 1, wherein the first conductor and the second conductor are on a lateral side of the housing furthest from a sagittal midline plane of a user of the hearing instrument when the user is wearing the hearing instrument.

9. The hearing instrument of claim 1, wherein:

the first conductor and the second conductor have opposing curvilinear shapes defining arcs of a circle or ellipse, and the hearing instrument further comprises a button within the circle or ellipse, wherein the button is a capacitive or mechanical button.

10. The hearing instrument of claim 9, further comprising a button cover that covers the button, wherein the button cover is removable to allow cleaning of acoustic paths to one or more microphones of the hearing instrument.

11. The hearing instrument of claim 1, further comprising sensing circuitry configured to detect perturbations in antenna performance due to either a user touching the external segments of the first and second conductors, being in close proximity to the external segments of the first and second conductors, or both.

12. The hearing instrument of claim 1, wherein the housing defines acoustic ports located between the external segment of the first conductor and the external segment of the second conductor.

13. The hearing instrument of claim 1, wherein:

the hearing instrument comprises a radio, a first inductor, and a second inductor, the first conductor has an internal segment that connects the external segment of the first conductor to a first capacitor, wherein the first capacitor is connected to the radio, the second conductor has an internal segment that connects the external segment of the second conductor to a second capacitor, wherein the second capacitor is connected to the radio, the first inductor is connected to the internal segment of the first conductor and components for recharging the rechargeable battery, and the second inductor is connected to the internal segment of the second conductor and the components for recharging the rechargeable battery, wherein the first and second capacitors and the first and second inductors are part of a diplexer circuit.

* * * * *